(12) United States Patent
Al Abbas et al.

(10) Patent No.: US 12,031,551 B2
(45) Date of Patent: Jul. 9, 2024

(54) FLEXIBLE ADAPTER FOR SUBMERSIBLE OILY AND STORM PUMPING SYSTEMS

(71) Applicant: SAUDI ARABIAN OIL COMPANY, Dhahran (SA)

(72) Inventors: Mustafa A. Al Abbas, Dhahran (SA); Muhannad A. Alsulami, Dhahran (SA); Samil Alshaibani, Dhahran (SA); Hyder Salem, Dhahran (SA); Ahmed I. Mulhim, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 48 days.

(21) Appl. No.: 17/722,015

(22) Filed: Apr. 15, 2022

(65) Prior Publication Data

US 2023/0332393 A1    Oct. 19, 2023

(51) Int. Cl.
*F04D 29/60* (2006.01)
*E03F 5/22* (2006.01)
*F04D 13/08* (2006.01)
*F16L 37/26* (2006.01)

(52) U.S. Cl.
CPC .............. *F04D 29/607* (2013.01); *E03F 5/22* (2013.01); *F04D 13/08* (2013.01); *F04D 29/606* (2013.01); *F16L 37/26* (2013.01); *E03F 2201/00* (2013.01); *F04D 13/086* (2013.01)

(58) Field of Classification Search
CPC ...... F04D 29/607; F04D 29/606; F04D 13/08; E03F 5/22; F16L 37/26
See application file for complete search history.

(56) References Cited

U.S. PATENT DOCUMENTS

| | | | | |
|---|---|---|---|---|
| 3,303,795 A | | 2/1967 | Slaughter | |
| 3,771,915 A | * | 11/1973 | Back | F04D 29/607 417/360 |
| 3,880,553 A | * | 4/1975 | Wolford | F04D 29/607 417/361 |
| 4,043,707 A | * | 8/1977 | Heumann | F04D 29/607 417/360 |
| 4,276,742 A | * | 7/1981 | Raasch | D01H 4/50 57/263 |
| 4,564,041 A | * | 1/1986 | Kramer | F04D 29/607 417/360 |

(Continued)

*Primary Examiner* — Peter J Bertheaud
(74) *Attorney, Agent, or Firm* — Osha Bergman Watanabe & Burton LLP

(57) ABSTRACT

An assembly, comprising a basin, a submersible pump, having an outlet, disposed within the basin, and an adapter. The adapter comprises a housing having a first side and a second side, a reducing passage extending axially through the housing from the first side to the second side, wherein the reducing passage has a varying inner diameter such that a first inner diameter transitions to a second inner diameter, a plurality of fastener receiving holes extending transversely through the housing and disposed radially and circumferentially around the reducing passage, and a plurality of fastening elements extending from the housing at the second side. The submersible pump outlet is connected to the adapter on the second side and an existing discharge line connected to the adapter on the first side. The adapter provides a transition from a diameter of the submersible pump outlet to a diameter of the existing discharge line.

6 Claims, 7 Drawing Sheets

(56) References Cited

U.S. PATENT DOCUMENTS

| | | | | |
|---|---|---|---|---|
| 4,886,426 A | * | 12/1989 | Surinak | E03F 5/22 |
| | | | | 417/360 |
| 5,507,628 A | * | 4/1996 | Masse | F04D 29/607 |
| | | | | 417/423.15 |
| 8,419,390 B2 | | 4/2013 | Merrill et al. | |
| 9,777,560 B2 | | 10/2017 | Tetzlaff et al. | |

* cited by examiner

FLEXIBLE ADAPTER FOR SUBMERSIBLE OILY AND STORM PUMPING SYSTEMS

BACKGROUND

Oily and storm water pumping systems may be installed in oil and gas facilities. Oily and storm water pumping systems lift collected wash-out and rainfall water from a low elevation basin to a high elevation. Collected wash-out and rainfall water may be transferred through a collection header for further processing, which may include separation and transportation for independent processing at another location. Wash-out and rainfall water may be lifted with a submersible pump, of which there are many different types of submersible pumps with different suction and discharge sizes, and corresponding discharge piping.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an assembly, comprising a basin, a submersible pump, having an outlet, disposed within the basin, and an adapter. The adapter comprises a housing having a first side and a second side, a reducing passage extending axially through the housing from the first side to the second side, wherein the reducing passage has a varying inner diameter such that a first inner diameter transitions to a second inner diameter, a plurality of fastener receiving holes extending transversely through the housing and disposed radially and circumferentially around the reducing passage, and a plurality of fastening elements extending from the housing at the second side. The submersible pump outlet is connected to the adapter on the second side and an existing discharge line connected to the adapter on the first side. The adapter provides a transition from a diameter of the submersible pump outlet to a diameter of the existing discharge line.

In another aspect, embodiments disclosed herein relate to a method of interchanging a pump in a pumping system. The method may include removing a first submersible pump from a basin to a ground level along at least one guide rail; providing an adapter, securing a first side of the adapter to a second submersible pump, and securing a second side of the adapter to a guide rail bracket. The second submersible pump may have a different output diameter than the first submersible pump. Securing the first side of the adapter to the second submersible pump and the second side of the adapter to the guide rail bracket comprises varying an inner diameter of the pumping system. The method may further include lowering the second submersible pump, the adapter, and the guide rail bracket down to the basin along the at least one guide rail, securing the guide rail bracket to a discharge tubing disposed within the basin, activating the pumping system, and maintaining a first discharge pressure and a first discharge flow across the adapter equal to a second discharge pressure and a second discharge flow, wherein the first submersible pump produces the second discharge pressure and the second discharge flow.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Disclosed herein are embodiments of apparatuses, assemblies, and methods for improving the versatility of a submersible oily and storm water pumping system. In one or more embodiments, a flexible adapter may be specifically manufactured to enable the replacement of an existing submersible pump with a given diameter with a new pump with a different diameter without replacing any other components within the oily and storm water pumping system. One or more embodiments disclosed herein relate to an adapter which may connect an existing oily and storm water pumping system and a new pump while maintaining the integrity of pump output, such as maintaining discharge pressure and flow.

Figure 1:
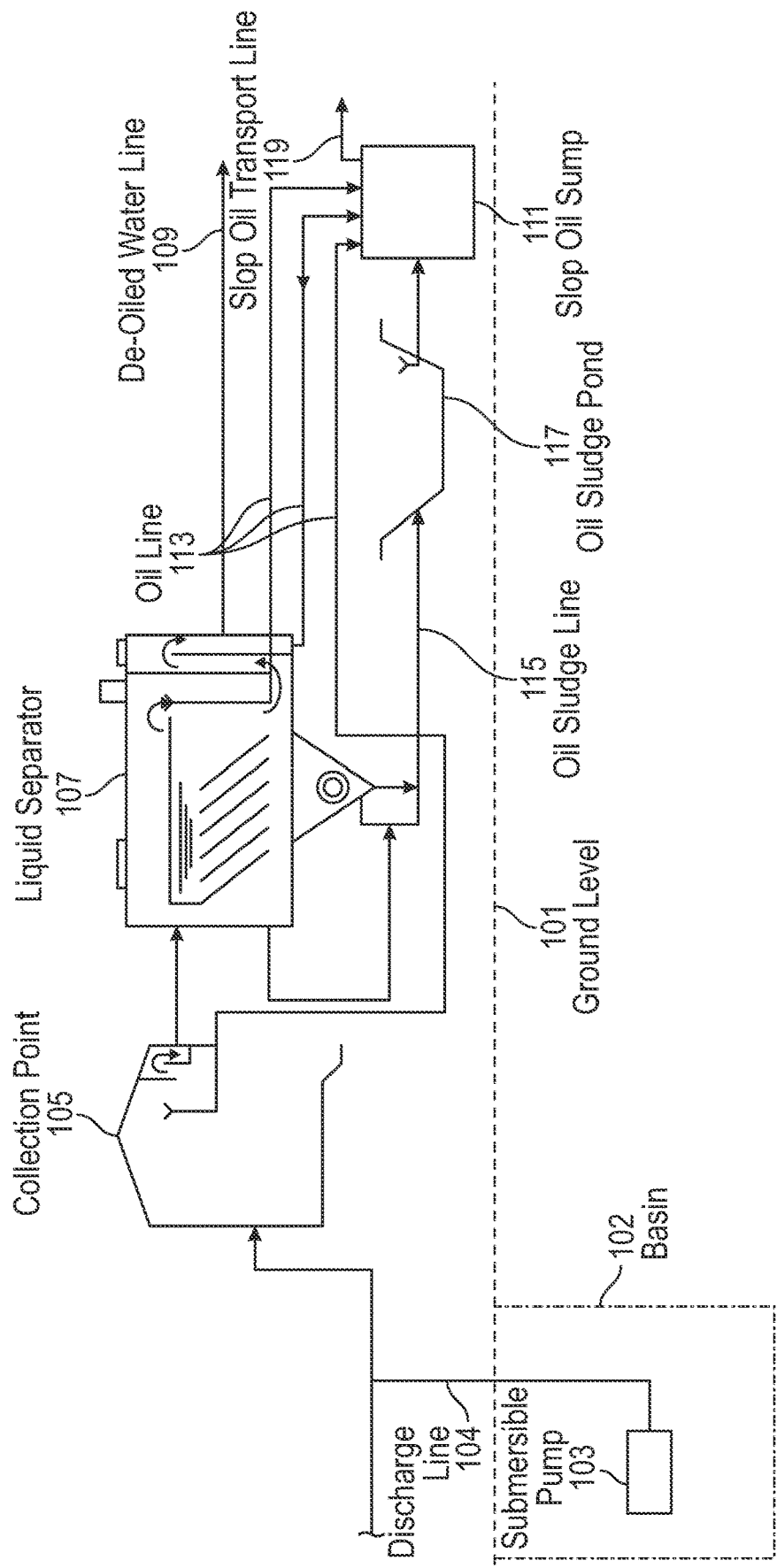
FIG. 1 shows an existing oily and storm water pumping system.

FIG. 1 shows an exemplary oily and storm water pumping system in accordance with one or more embodiments. In one or more embodiments, a plurality of basins 102 may be located below ground level 101. The basins 102 may collect wash-out and rainwater water. A submersible pump 103 may be located in each basin 102 and may be used to lift collected wash-out and rainfall water from the basin 102 to above ground level 101 for processing. In one or more embodiments, collected wash-out and rainwater from multiple basins 102 may be pumped through a discharge line 104 to a collection point 105. In one or more embodiments, separation of oil and water may begin at the collection point 105. Liquid separation may continue in the liquid separator 107. Separated water may be transported from the liquid separator 107 to one or more evaporation ponds (not pictured) via a de-oiled water line 109. Separated oil may be transported to a slop oil sump 111 via a plurality of lines. In one or more embodiments, the plurality of lines may include one or more oil lines 113. The plurality of lines may also include an oil sludge line 115, which may direct oil sludge from the liquid separator 107 through an oil sludge pond 117. Oil from the oil sludge pond 117 may then be directed to the slop oil sump 111. Collected oil in the slop oil sump 111 may then be transported to other locations for independent processing.

Figure 2A:
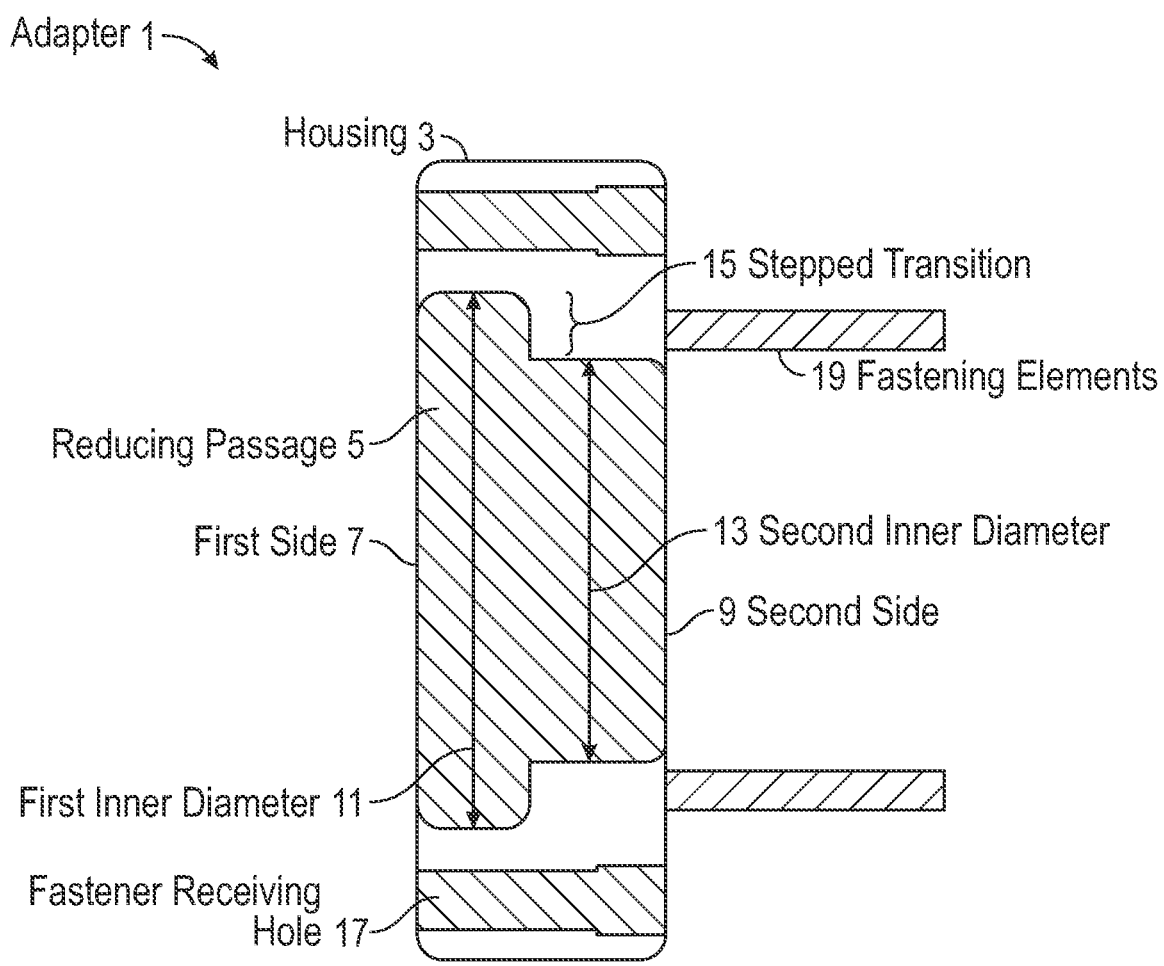
FIG. 2A-2B show cross-sectional views of an adapter in accordance with one or more embodiments.
Figure 2B:
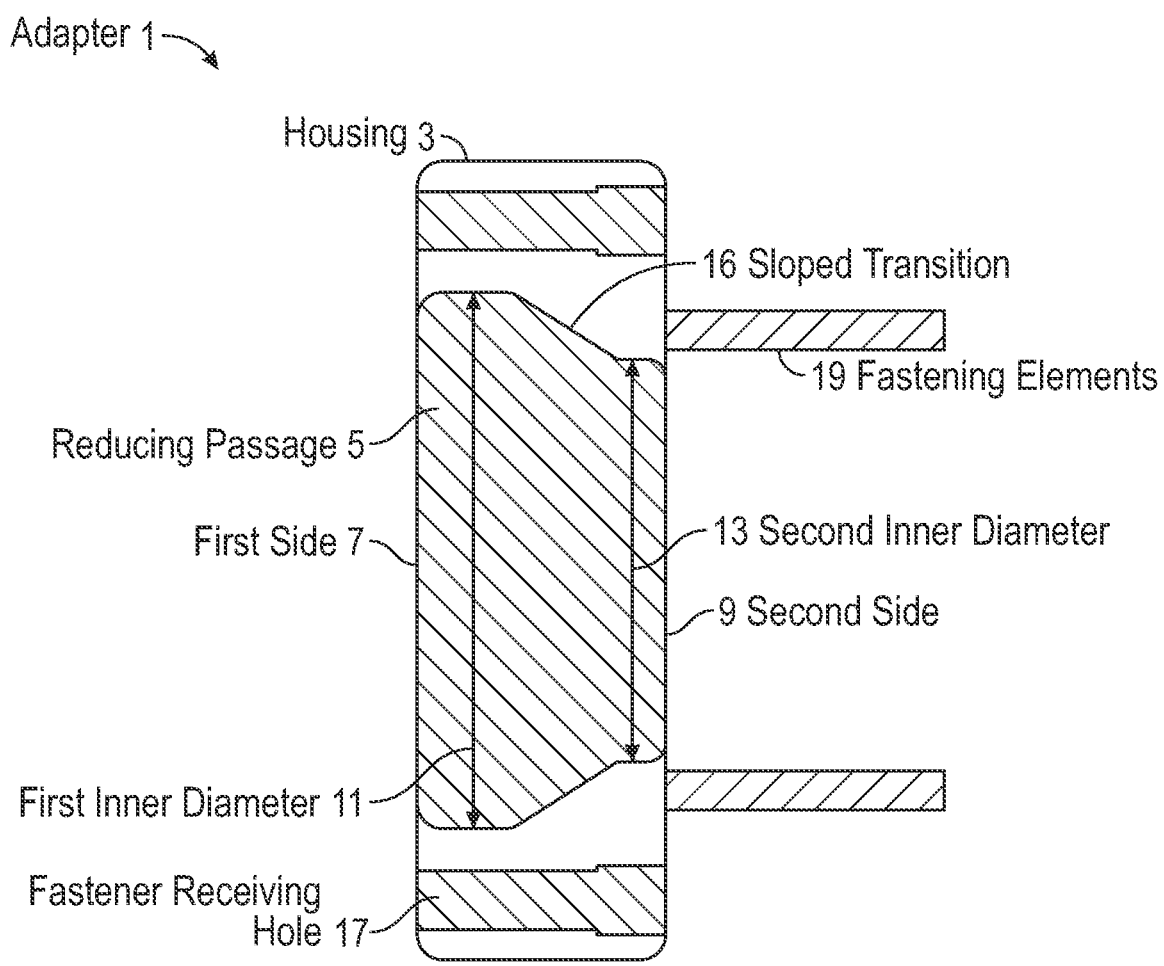

FIGS. 2A and 2B depict cross-sectional views of an adapter 1 in accordance with one or more embodiments. The adapter may include a housing 3, through which a reducing passage 5 extends axially from a first side 7 to a second side 9. The reducing passage 5 may be hollow, such that a fluid may flow through the reducing passage 5. The reducing passage 5 may also have a varying inner diameter, such that it transitions from a first inner diameter 11 to a second inner diameter 13. In one or more embodiments, as shown in FIG. 2A, a stepped transition 15 may connect the first inner diameter 11 to the second inner diameter 13. In other embodiments, as shown in FIG. 2B, a sloped transition 16 may connect the first inner diameter 11 to the second inner diameter 13.

The first side 7 of the housing 3 may be connected to a submersible pump (not pictured). In one or more embodiments, the submersible pump may be an existing pump already integrated into the implemented oily and storm water pumping system. Fastener receiving holes 17 may extend transversely through the housing and may be arranged circumferentially around the reducing passage 5. When a flange of the submersible pump is mated with the first side 7 of the housing 3, fasteners (not pictured) may be inserted into the fastener receiving holes 17, such that a seal is formed between the submersible pump and the adapter 1. In one or more embodiments, the seal may be created by compressive forces between the submersible pump and the adapter 1 when they are mated. However, there may be other embodiments in which the seal may formed in other ways. The second side 9 of the housing 3 may be connected to a guide rail bracket (not pictured), which may be secured to an existing discharge tubing and guide rail assembly. A plurality of fastening elements 19 may extend from the second side 9 of the housing 3 and may threadably connect the second side 9 of the housing 3 to a flange of the guide rail bracket. Similar to the connection formed between the housing 3 and the submersible pump, a seal may be formed between the housing 3 and the flange of the guide rail bracket.

In one or more embodiments, the submersible pump may have a diameter of four inches, while the guide rail bracket may have a diameter of two inches. In such embodiments, the first inner diameter 11 of the reducing passage 5 may be equal to the diameter of the submersible pump, and the second inner diameter 13 of the reducing passage 5 may be equal to the diameter of the guide rail bracket.

In one or more embodiments, an existing submersible pump may be a pump with a given set of specifications, such as capacity, head, and power. In such embodiments, the existing submersible pump may no longer be in production and may be approaching the end of its service life. A new submersible pump may be a proposed replacement with specifications that closely resemble those of the existing submersible pump. More specifically, the new submersible pump may have a comparable capacity to the existing submersible pump. Further, the new submersible pump may have an electrical ampere requirement which does not exceed that of the existing submersible pump. The adapter 1 may allow for the existing submersible pump and the new submersible pump to be switched, with no need for any additional modifications to the existing oily and storm water pumping system.

Figure 3:
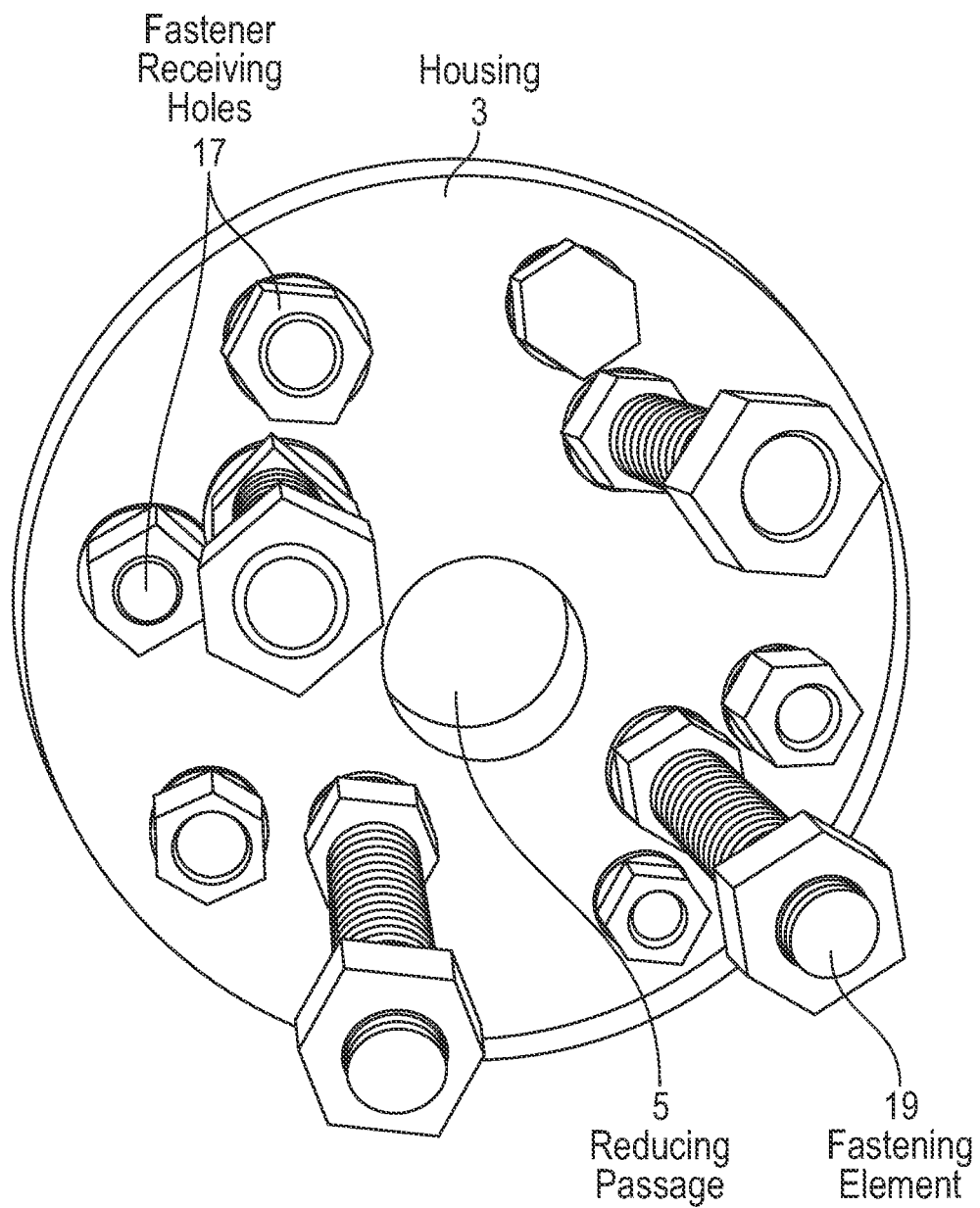
FIG. 3 shows a perspective view of an adapter in accordance with one or more embodiments.

FIG. 3 shows a perspective view of an adapter in accordance with one or more embodiments. More specifically, FIG. 3 shows the positioning of the fastener receiving holes 17 and the plurality of fastening elements 19 with respect to the housing 3 and reducing passage 5. The fastener receiving holes 17 may be arranged circumferentially around the housing, radially exterior to the reducing passage 5 and the plurality of fastening elements 19. The number of fastener receiving holes 17 may vary based on the specific application requirements. The plurality of fastening elements 19 may extend from the second side 9 of the housing 3 and may be arranged circumferentially around the reducing passage 5. Further, the plurality of fastening elements 19 may be positioned radially exterior to the reducing passage 5, but radially interior to the fastener receiving holes 17. The spacing between the fastener receiving holes 17 and the plurality of fastening elements 19 must be large enough to avoid interference, however there is no maximum or minimum spacing. The spacing may be determined by operators or fabricators based on situational requirements. As shown in FIG. 3, in one or more embodiments, the adapter 1 may be cylindrical in shape. However, there are many potential shapes and sizes of the adapter 1 which may be implemented without departing from the scope of this disclosure.

Figure 4:
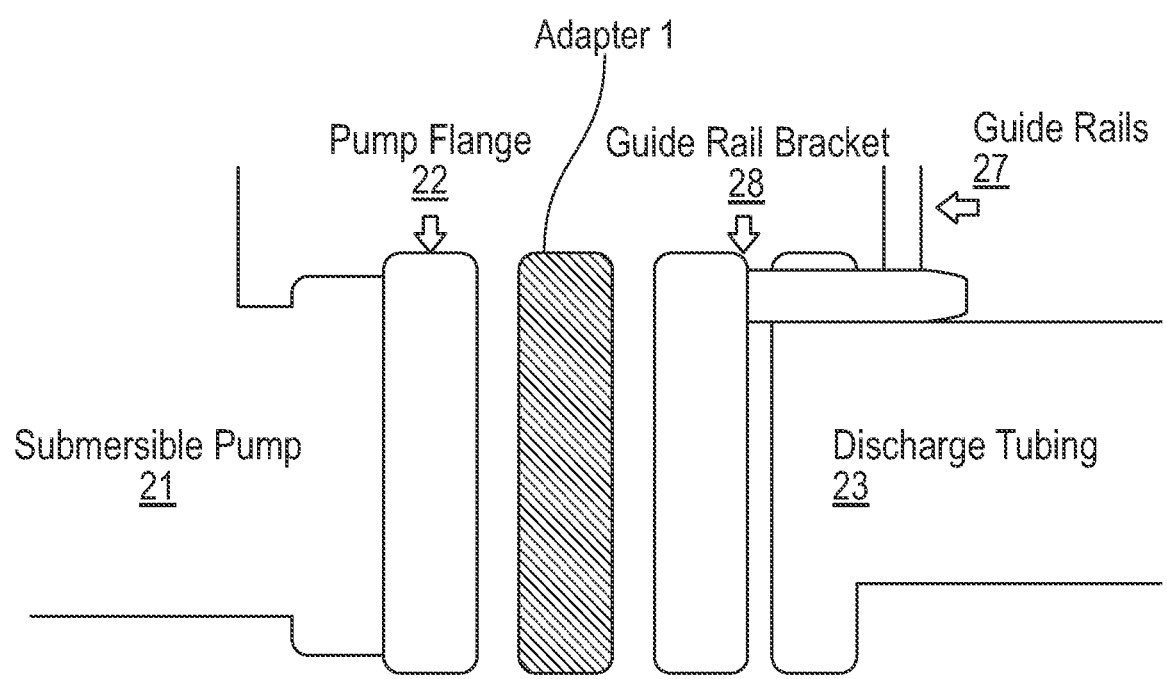
FIG. 4 shows an assembly in accordance with one or more embodiments.

FIG. 4 shows an assembly in accordance with one or more embodiments. More specifically, FIG. 4 shows how the adapter 1 may be integrated into an existing pumping system. Though the pump flange 22, adapter 1, and guide rail bracket 28 appear to have the same sizing and diameter, there are many embodiments in which the pump flange 22 and the guide rail bracket 28 have different diameters. As such, the shapes and corresponding sizing shown in FIG. 4 are for illustrative purposes only.

In a typical pumping system, guide rails 27 are installed within the system to assist with installation of components below the ground level 101. The guide rails 27 may have an attached guide rail bracket 28, which may be connected to a discharge tubing 23 disposed within the system basin 102. The flange 22 of the submersible pump 21 may mate with a first side of the adapter 1, such that a seal is formed. Similarly, the second side of the adapter 1 may mate with the guide rail bracket 28, creating a seal.

Figure 5A:
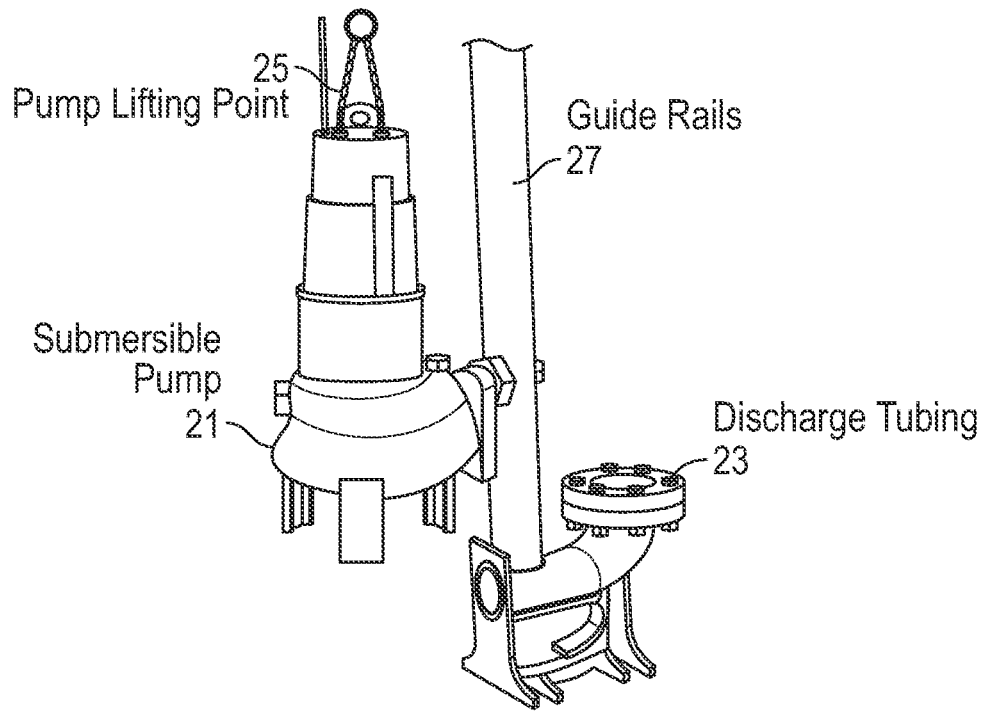
FIG. 5A-5B show the installation of an assembly in accordance with one or more embodiments.
Figure 5B:
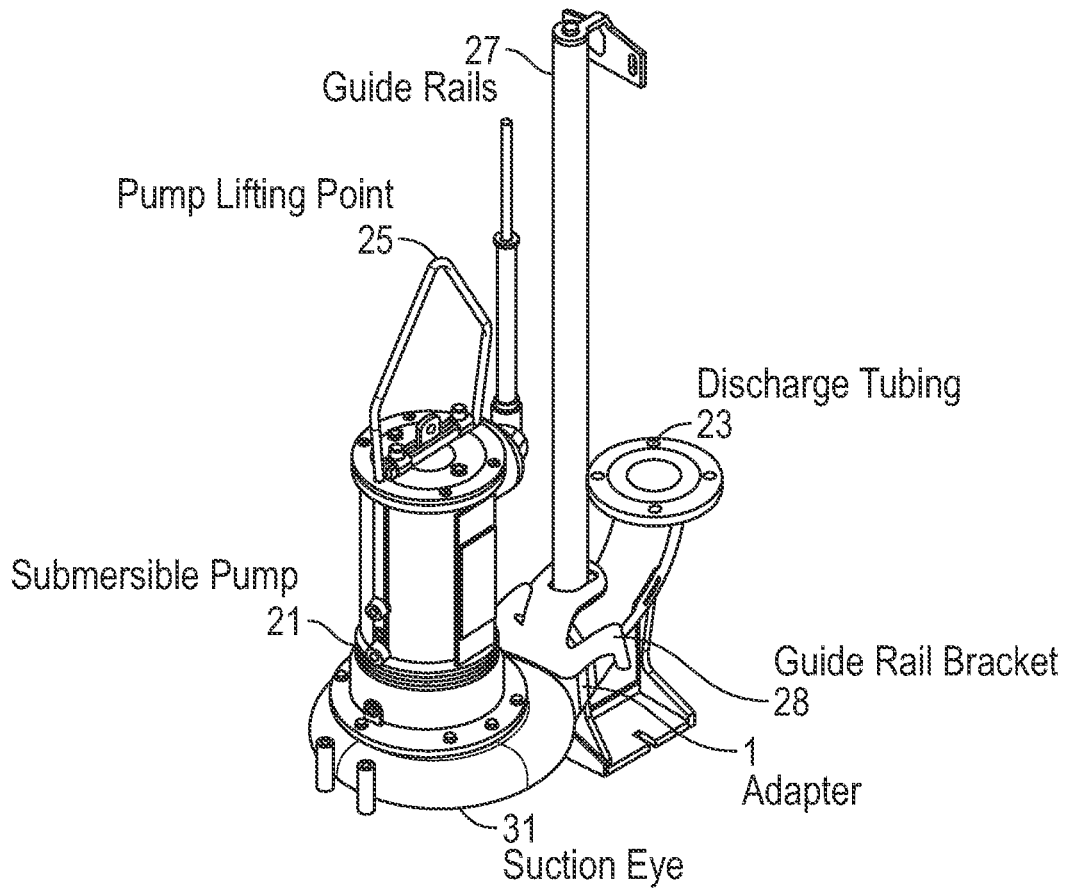

FIGS. 5A-5B show the installation of an assembly in accordance with one or more embodiments. More specifically, FIGS. 5A-5B show the integration of the adapter 1 with a submersible pump 21. In one or more embodiments, an old submersible pump (not pictured) may have previously been removed from the existing pumping system. The submersible pump 21 may be a direct replacement for the old submersible pump, such that the combination of the adapter 1 and submersible pump 21 may maintain a discharge pressure and flow equal to that produced by the old submersible pump. In order to install the submersible pump 21, the adapter 1 may be fitted above the ground level 101. The flange 22 of the submersible pump 21 and a first side of the adapter 1 may be mated together and secured with a plurality of fastening elements 19. In a similar manner, the second side of the adapter 1 and the guide rail bracket 28 may be mated together with a plurality of fastening elements 19. The guide rail bracket 28 may connect the pump-adapter assembly to the guide rails 27. The pump-adapter-guide rail bracket assembly may be lowered down into the basin 102 along the guide rails 27. Once lowered fully into the basin 102, the pump-adapter-guide rail bracket assembly may be connected to the existing discharge tubing 23 via a plurality of fastening elements 19.

The submersible pump 21 may have a pump lifting point 25, which may allow for removal of the pump in instances of maintenance, repair, or replacement. In instances of maintenance, repair, or replacement, the submersible pump 21 may be lifted from its operating position in the basin 102 along the guide rails 27 to ground level 101. Fluids may be drawn up into the submersible pump 21 through a suction eye 31 and then may be propelled through the discharge tubing 23.

Figure 6:
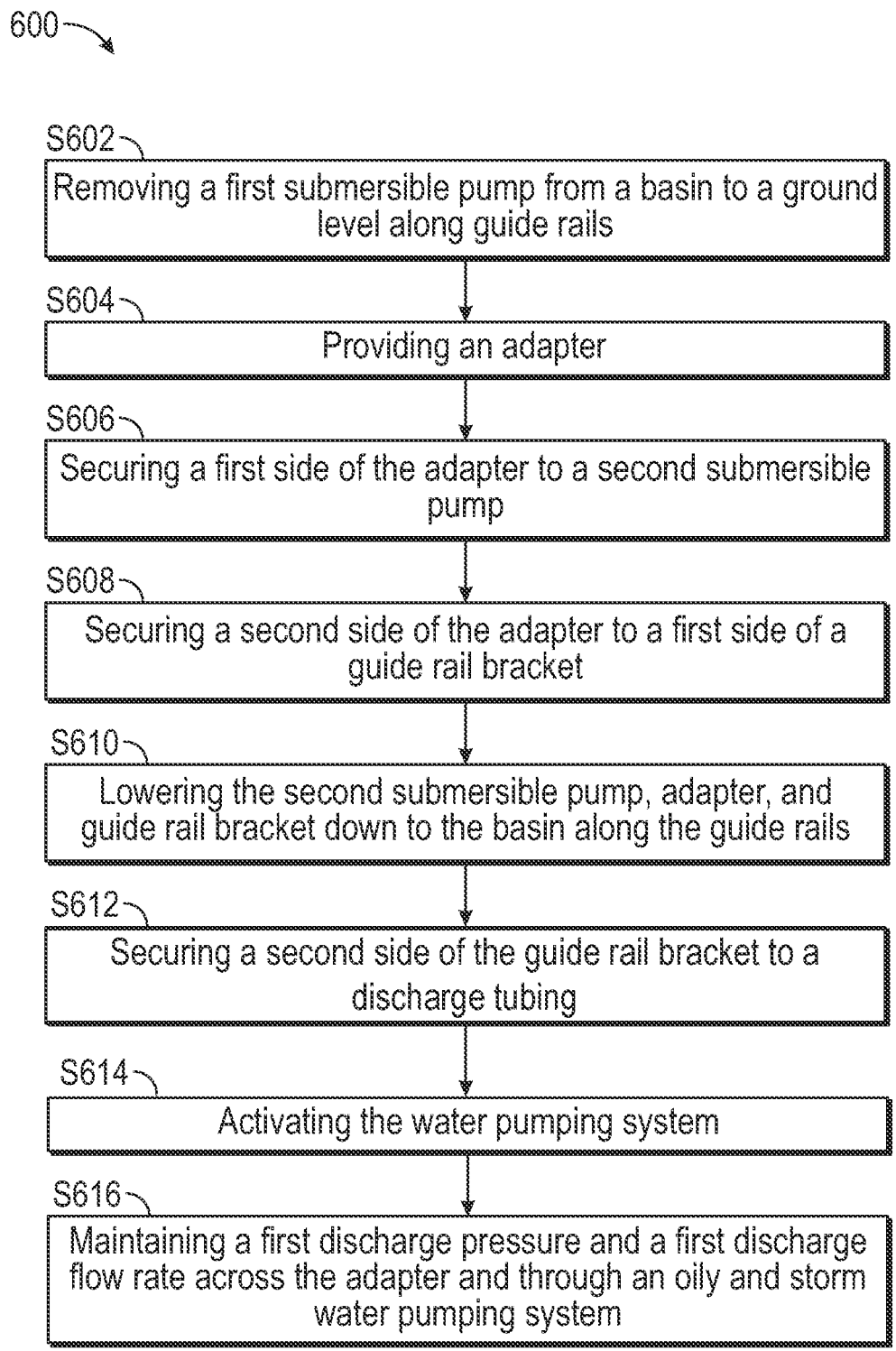
FIG. 6 shows a flowchart of a method in accordance with one or more embodiments.

FIG. 6 shows a flowchart 600 of a method in accordance with one or more embodiments. More specifically, FIG. 6 depicts a flowchart 600 of a method for interchanging a first submersible pump with a second submersible pump, which has a different outlet diameter, via the use of a flexible adapter. Further, one or more blocks in FIG. 6 may be performed by one or more components as described in FIGS. 1-5. While the various blocks in FIG. 6 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, a first submersible pump may be removed from a basin 102, S602. In one or more embodiments, the first submersible pump may be removed due to reaching the end of its service life. In other embodiments, the first submersible pump may require routine maintenance or repairs. The first submersible pump may be removed from the basin 102 by raising the pump at the pump lifting point 25 along the guide rails 27. In one or more embodiments, it may be desirable to fit either a permanent or temporary replacement pump in order to reduce pumping system downtime as much as possible. In order to achieve such a goal, an adapter 1 may be provided, S604. The adapter 1 may be flexible in design, such that the adapter 1 may be produced to fit a variety of pump and discharge sizes. For example, the adapter 1 may have an internal transition through the reducing passage 5 from a first inner diameter 11 to a second inner diameter 13.

A first side of the adapter 1 may be secured to a second submersible pump 21, which may be a replacement for the first submersible pump, S606. The second submersible pump 21 may have substantially similar properties and specifications as the first submersible pump. However, the second submersible pump 21 may have a different outlet diameter than the first submersible pump. In one or more embodiments, the second submersible pump 21 may have a larger outlet diameter than the first submersible pump. However, there are also many embodiments in which the reverse is true. Therefore, the adapter may have a first inner diameter 11 equal to the diameter of the outlet of the second submersible pump 21. The second submersible pump 21 may have a flange 22, which mates with the first side 7 of the housing 3. A plurality of fastening elements 19 may threadably connect the pump flange 22 and the housing 3, such that a seal is formed between the two parts. In one or more embodiments, the plurality of fasteners 19 may be bolts or studs.

The second side 9 of the housing 3 may be secured to a first side of a guide rail bracket 28 in the same manner as the first side 7 was secured to the pump flange 22, S608. The second inner diameter 13 of the adapter 1 may be equal to the diameter of the internal diameter of the guide rail bracket 28 and the discharge tubing 23. The housing 3 may mate with the guide rail bracket 28, such that both pieces are flush with each other. The plurality of fastening elements 19 may extend through the guide rail bracket 28, threadably connecting the adapter 1 and the guide rail bracket 28. This may create a seal between the two parts. In one or more embodiments, the plurality of fastening elements 19 may be bolts or studs. The second submersible pump 21, the adapter 1, and the guide rail bracket 28 may then be lowered into the basin 102 along the guide rails 27, S610. Once in the basin, a second side of the guide rail bracket 28 may be secured to a discharge tubing 23, S612.

The oily and storm water pumping system may be activated such that collected wash-out and rainfall water may be lifted from a low elevation basin to a high elevation through a collection header, S614. The collected fluids may then be processed. The first submersible pump and the second submersible pump 21 may have substantially similar specifications. In particular, the second submersible pump 21 must have an electrical ampere requirement which does not exceed that of the first submersible pump. For example, in one or more embodiments, the first submersible pump may have an electrical ampere requirement of 77.6 A. In such embodiments, the second submersible pump 21 must have an electrical ampere requirement of 77.6 A or less. This allows for the preservation of the newly installed motor which may power the second submersible pump 21. Similarly, the second submersible pump 21 may have a capacity as close as possible to that of the first submersible pump. For example, in one or more embodiments, the first submersible pump may have a capacity of 160.7 US Gallons per minute (USGPM) and the second submersible pump 21 may have a capacity of 150 USGPM. As such, a first discharge pressure and a first discharge flow rate may be maintained across the adapter and through the oily and storm water pumping system, S616. The first discharge pressure and the first discharge flow rate may be equal to a second discharge pressure and a second discharge flow rate, which may be produced by the first submersible pump when connected to the oily and storm water pumping system.

The method in flowchart 600 may be applied to any number of oily and storm water pumping systems with a variety of pump and discharge sizes. The adapter 1 may be fabricated from any raw material available to allow for inexpensive and quick production. In one or more embodiments, the adapter 1 may be fabricated from stainless steel. The adapter 1 may be implemented within the oily and storm water pumping system as a long-term improvement to the system.

Embodiments of the present disclosure may provide at least one of the following advantages. In many oily and storm water pumping systems, a single pump type may be used, and discharge piping used within the system has been specifically chosen and installed with the single pump in mind. However, if and when this single pump requires maintenance, repair, or replacement, the oily and storm water pumping system may be subject to a period of downtime. In one or more embodiments, where the single pump needs to be replaced, the single pump may no longer be in production, rendering it obsolete. In such embodiments, a prospective replacement pump may not have the same dimensions as the original pump. Therefore, the discharge piping already installed may not be compatible with the prospective replacement pump. In such instances, replacing the entire discharge piping system would be expensive and would require a large volume of system downtime in order to complete the extensive replacement operation.

However, implementation of a flexible adapter, of which embodiments are discussed herein, allows for the existing discharge piping to remain in place and requires replacement of only the pump. Further, implementation of the flexible adapter allows for the maintenance of previous operational standards, such as discharge pressure and discharge flow rate. Installation of the flexible adapter may be completed quickly in contrast with a total system replacement, therefore limiting system downtime to a minimum. Implementation of such a flexible adapter also offers an inexpensive modification to the system, since the adapter may be fabricated from any available raw material. Further, should the discharge piping require replacement in the future, the design of the adapter is flexible in that a new adapter could be fabricated to fluidly connect the existing pump with a new discharge line.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method of interchanging a pump in a pumping system, comprising:
   removing a first submersible pump from a basin to a ground level along at least one guide rail;
   providing an adapter having a reducing passage extending from a first side to a second side,
   wherein the reducing passage has a varying inner diameter and an internal transition that transitions a first inner diameter of the reducing passage to a second inner diameter of the reducing passage, the first inner diameter being different from the second inner diameter;
   securing the first side of the adapter to a second submersible pump;
   securing the second side of the adapter to a guide rail bracket,
   wherein the second submersible pump has a different output diameter than the first submersible pump;
   wherein securing the first side of the adapter to the second submersible pump and the second side of the adapter to the guide rail bracket comprises varying an inner diameter of the pumping system via said reducing passage;
   lowering the second submersible pump, the adapter, and the guide rail bracket down to the basin along the at least one guide rail;
   securing the guide rail bracket to a discharge tubing disposed within the basin;
   activating the pumping system; and
   maintaining a first discharge pressure and a first discharge flow across the adapter equal to a second discharge pressure and a second discharge flow,
   wherein the first submersible pump produces the second discharge pressure and the second discharge flow.

2. The method of claim 1, further comprising lifting collected wash-out and rainfall water from the basin through a collection header.

3. The method of claim 1, wherein securing the first side of the adapter to the second submersible pump comprises:
   mating a pump flange with a face of the first side of the adapter; and
   threadably connecting the pump flange to the face of the first side of the adapter with a plurality of fasteners.

4. The method of claim 1, wherein securing the second side of the adapter to the guide rail bracket comprises:
   mating a face of the guide rail bracket with a face of the second side of the adapter; and
   threadably connecting the face of the guide rail bracket to the face of the second side of the adapter with a plurality of fastening elements.

5. The method of claim 1, wherein the adapter maintains a discharge pressure between the second submersible pump and the discharge tubing.

6. The method of claim 1, wherein the second submersible pump has an equivalent electrical ampere requirement to the first submersible pump.

* * * * *